United States Patent
Bening et al.

(10) Patent No.: US 10,336,884 B2
(45) Date of Patent: Jul. 2, 2019

(54) BLOCK COPOLYMERS FOR GEL COMPOSITIONS

(71) Applicant: KRATON POLYMERS U.S. LLC, Houston, TX (US)

(72) Inventors: Robert Bening, Houston, TX (US); Ruidong Ding, Houston, TX (US); Huixian Yang, Shanghai (CN); Catherine Maris, Mont St. Guibert (BE)

(73) Assignee: Kraton Corporation, Houston, TX (US)

( * ) Notice: Subject to any disclaimer, the term of this patent is extended or adjusted under 35 U.S.C. 154(b) by 126 days.

(21) Appl. No.: 15/649,495

(22) Filed: Jul. 13, 2017

(65) Prior Publication Data
US 2018/0016413 A1    Jan. 18, 2018

Related U.S. Application Data

(60) Provisional application No. 62/361,652, filed on Jul. 13, 2016.

(51) Int. Cl.
*C08K 5/01* (2006.01)
*C08L 53/02* (2006.01)
*C08L 91/00* (2006.01)
*C08F 293/00* (2006.01)
*C08F 297/04* (2006.01)

(52) U.S. Cl.
CPC ............. *C08K 5/01* (2013.01); *C08F 293/00* (2013.01); *C08F 297/04* (2013.01); *C08L 53/02* (2013.01); *C08L 53/025* (2013.01); *C08L 91/00* (2013.01)

(58) Field of Classification Search
CPC ...... C08F 293/00; C08L 25/10; C08L 53/025; C08L 2555/60; C08L 2555/74; C08L 101/12; C08L 53/02; C08K 5/01
See application file for complete search history.

(56) References Cited

U.S. PATENT DOCUMENTS

| | | |
|---|---|---|
| 3,595,942 A | 7/1971 | Wald et al. |
| 3,634,549 A | 1/1972 | Shaw et al. |
| 3,670,054 A | 6/1972 | De La Mare et al. |
| 3,700,633 A | 10/1972 | Wald et al. |
| 4,333,564 A | 6/1982 | Hertl et al. |
| 5,505,773 A | 4/1996 | Vitands et al. |
| 5,737,469 A | 4/1998 | Costello et al. |
| 5,747,433 A * | 5/1998 | Luciani ............... C10M 143/12 508/479 |
| 5,925,707 A | 7/1999 | Shafer et al. |
| 7,220,798 B2 | 5/2007 | Atwood et al. |
| 2004/0138371 A1* | 7/2004 | St. Clair ............. C08F 293/005 524/505 |
| 2013/0331479 A1 | 12/2013 | Dupont et al. |
| 2015/0166766 A1 | 6/2015 | Friedel |
| 2015/0219796 A1 | 8/2015 | Salazar |

FOREIGN PATENT DOCUMENTS

| | | | |
|---|---|---|---|
| CN | 105301714 A | 2/2016 | |
| EP | 0822227 A1 * | 2/1998 | ............ C08L 53/025 |
| KR | 10-2011-0132763 A | 12/2011 | |

* cited by examiner

*Primary Examiner* — Satya B Sastri

(57) ABSTRACT

Compositions comprising (i) a hydrogenated styrenic block copolymer, (ii) an oil, and (iii) optional additives are described herein. Compositions include but are not limited to cable fillings. The styrenic block copolymer having peak molecular weight of from about 125 to about 300 kg/mol, an oil and optional additives are described herein. The block copolymer includes a B block having vinyl content of from about 35% to about 49% and an S block having a polystyrene content of from about 28% to about 40%. The compositions may form a gel having a thixotropic ratio at 25° C. of from about 5 to about 10 and further characterized by specific low, middle and high shear rate viscosities at 25° C. and shear rates of 6 s$^{-1}$, 50 s$^{-1}$ and 200 s$^{-1}$ of from 10,000 cps to 750,000 cps, 1,000 cps to 100,000 cps and 1,000 cps to 6,000 cps, respectively; a drop point from 100° C. to 250° C.; and a cone penetration at 25° C. of from 300 dmm to 685 dmm.

17 Claims, No Drawings

BLOCK COPOLYMERS FOR GEL COMPOSITIONS

CROSS REFERENCE TO RELATED APPLICATIONS

This application claims the benefit of U.S. Provisional Application No. 62/361,652, filed Jul. 13, 2016, incorporated herein in its entirety.

TECHNICAL FIELD

The present disclosure is in the field of chemistry. More specifically, the present disclosure relates to compositions and methods for the preparation of gel compositions comprising styrenic block copolymers.

BACKGROUND

A variety of materials (e.g., optical fiber cables, concrete) are subjected to stresses during their manufacture, installation, and/or operation that may compromise their intended function. Reinforcing and/or protective materials are often introduced to provide a composite structure that serves to mitigate the detrimental effects of the stresses on the material's intended function. For example, in optical fiber cables a plurality of cables are enclosed together in an extended plastic tube. A protective gel composition is also present that functions to protect both the structural and functional integrity of the optical cables. As another example, post-tensioning cables used in the concrete reinforcement often contain a plurality of wires that can be protected utilizing a gel composition.

U.S. Pat. No. 5,737,469 discloses hydrophobic compositions useful for filling the voids within jacketed optical fiber cables. The compositions include about 85 to 95 parts by weight of mineral oil, 5 to 15 parts by weight of a (styrene)-(ethylene/propylene) diblock copolymer having a styrene:(ethylene/propylene) ratio of 37.5:62.5 to 27.5:72.5 and a specific gravity of about 0.90 to 0.95, optional antioxidant, and optional metal deactivator.

U.S. Pat. Application Publication No. 2015/0166766 A1 discloses a cable fill composition for an optical fiber cable, said cable fill composition comprising (i) a Fischer-Tropsch derived base oil; and (ii) a thickening system, wherein the thickening system comprises at least one block copolymer.

There exists an ongoing need for improved gel compositions that function to protect the structural and functional integrity of optical fiber cables while finding utility in other applications.

SUMMARY

Provided herein are compositions including an S-EB hydrogenated styrenic block copolymer having a peak molecular weight of from about 125 to about 300 kg/mol, an oil, and optionally additives wherein the composition forms a gel having a thixotropic ratio at 25° C. of from about 5 to about 10. The composition may further include a hydrocarbon resin. The S-EB hydrogenated styrenic block copolymer may include a B block characterized as a conjugated diene and an S block characterized as styrene, alpha-methylstyrene, para-methylstyrene, vinyl toluene, vinylnaphthalene, diphenyl ethylene, para-butyl styrene, or mixtures thereof. The B block may be further characterized as a conjugated 1,3-butadiene or a conjugated substituted butadiene, or a mixture thereof. The S-EB block copolymer may have a vinyl content of the conjugated diene in the B block from about 35% to about 49%. The S-EB hydrogenated styrenic block copolymer has a polystyrene content of from about 28% to about 40% based upon the total S-EB hydrogenated styrenic block copolymer. The composition may contain the S-EB hydrogenated styrenic block copolymer in an amount of from about 4 wt. % to about 20 wt. % based on the total weight of the composition. The composition may have a low shear rate viscosity at 25° C. and a shear rate of 6 $s^{-1}$ of from about 10,000 cps to about 750,000 cps; a middle shear rate viscosity at 25° C. and a shear rate of 50 $s^{-1}$ of from about 1,000 cps to about 100,000 cps; a high shear rate viscosity at 25° C. and a shear rate of 200 $s^{-1}$ of from about 1,000 cps to about 6,000 cps; a thixotropic ratio of at 25° C. of from about 5 to about 10; a drop point of from about 100° C. to about 250° C.; and a cone penetration at 25° C. of from about 300 dmm to about 685 dmm.

DETAILED DESCRIPTION

Molecular weights described herein are polystyrene equivalent molecular weights and can be measured by Gel Permeation Chromatography (GPC), where the GPC system has been appropriately calibrated, unless otherwise specified, the reported values represent the molecular weight at the peak of the distribution, sometimes referred to as peak molecular weight. Polymers of known molecular weight are used for calibration and these must be of the same molecular structure and chemical composition as the unknown polymers that are to be measured.

Herein the term "vinyl" is used to describe the polymer product that is made when 1,3-butadiene is polymerized via a 1,2-addition mechanism. The result is a mono-substituted olefin group pendant to the polymer backbone, a vinyl group. In the case of anionic polymerization of isoprene, insertion of the isoprene via a 3,4, addition mechanism affords a geminal dialkyl C≡C moiety pendant to the polymer backbone. The effects of the 3,4-addition polymerization of isoprene on the final properties of the block copolymer will be similar to those from 1,2-addition of butadiene.

The polystyrene content (PSC) in block copolymers of the present disclosure may be determined using any suitable methodology such as proton nuclear magnetic resonance (NMR).

The drop point herein refers to temperature at which an oleaginous material passes from a semi-solid to a liquid state under specific test conditions.

Oil separation herein refers to the phenomenon of static oil bleed or oil puddling where oil is released from a thickening matrix associated with a grease where a grease herein refers to an oily material.

One or more of the following analytical methodologies were employed in evaluation of the disclosed compositions:

DIN 53019 is entitled "Viscometry—Measurement of Viscosities and Flow Curves by Means of a Rotational Viscometer." The term "DIN 53019" as used herein refers to the method for measuring viscosities. The measurements are generally carried out using a Brookfield HBDV-II+ Pro Viscometer, Spindle: CPE52 at a temperature of equal to or greater than 25° C., with a water-bath control. Viscosity was measured at shear rates of 6 $s^{-1}$ (3 rpm), 50 $s^{-1}$ (25 rpm), and 200 $s^{-1}$ (100 rpm).

ASTM 6184 is entitled "Standard Test Method for Oil Separation from Lubricating Grease." The term "ASTM D6184" as used herein refers to the method for the determination of the tendency of lubricating grease to separate oil at an elevated temperature. The test in accordance with this method was generally performed at 80° C. and 24 hours unless otherwise indicated.

ASTM D566 is entitled "Standard Test Method for Dropping Point of Lubricating Grease." The term "ASTM D566" as used herein refers to the method for the determination of the dropping point of lubricating grease. A sample of lubricating grease generally contained in a cup was suspended in a test tube and heated in an oil bath at a prescribed rate to a temperature in the range of 100° C. to 250° C. or from 150° C. to 250° C. The temperature at which the material falls from the hole in the bottom of the cup was averaged with the temperature of the oil bath and recorded as the dropping point of the grease.

ASTM D937 is entitled "Standard Test Method for Cone Penetration of Petrolatum." The term "ASTM D937" as used herein refers to the method for measuring with a penetrometer the penetration of petrolatum as an empirical measure of consistency. This test is generally performed at temperatures of 25±2° C.; −40±2° C. and the average of three determinations recorded, unless specified otherwise.

Disclosed herein are compositions comprising i) a styrenic block copolymer, ii) an oil and optionally iii) additives. Such materials may find utility as gel compositions that display improved thickening, broad compatibility with a variety of oils, and temperature resistance. In an aspect, the compositions disclosed herein find utility as filling and flooding gels in cables, as components in the manufacture of cosmetics, and as components of wellbore-servicing compositions and as corrosion inhibiting coatings for metal.

In an aspect, a gel composition of the present disclosure comprises a styrenic block copolymer. A styrenic block copolymer suitable for use in the present disclosure contains a polymer block of a monoalkenyl arene, denoted an S block, and a polymer block of one or more conjugated dienes, denoted a B block.

In an aspect, the S block comprises styrene, alpha-methylstyrene, para-methylstyrene, vinyl toluene, vinylnaphthalene, diphenyl ethylene, para-butyl styrene, or mixtures thereof; alternatively the S block comprises styrene.

In an aspect, an SEB suitable for use in the present disclosure has a polystyrene content of from about 28% to about 40% based on the range of polystyrene contents shown to produce gels with good shear thinning performance, and acceptable cone penetration and drop point values, alternatively from about 30% to about 32%, or alternatively equal to or greater than about 30%.

In an aspect, the B block comprises a conjugated 1,3-butadiene or conjugated substituted butadienes such as piperylene, 2,3-dimethyl-1,3-butadiene, and 1-phenyl-1,3-butadiene, or mixtures thereof and/or mixtures in conjunction with isoprene. In an aspect, the B block comprises conjugated 1,3-butadiene. As used herein, and in the claims, "butadiene" refers specifically to "1,3-butadiene."

Polymerization conditions to prepare an SEB of the type disclosed herein are similar to those used for anionic polymerizations. For example, the polymerization may be carried out at a temperature of from about −30° C. to about 150° C. in an inert atmosphere such as nitrogen, under a pressure within the range of from about 0.5 to about 10 bars. Suitable reaction conditions also include one or more polymerization initiators, for example, alkyl lithium compounds such as s-butyllithium, n-butyllithium, t-butyllithium, amyllithium and the like Additional disclosure on the preparation of an SEB can be found in U.S. Pat. No. 7,220,798, the relevant portions of which are incorporated herein by reference.

In an aspect, the vinyl content of the conjugated diene in the B block ranges from about 35% to about 49%, alternatively from about 35% to about 45%, or alternatively from about 38% to about 40%.

SEB polymers suitable for use in the present disclosure are hydrogenated or selectively hydrogenated materials. Hydrogenation can be carried out via any suitable hydrogenation or selective hydrogenation process. For example, methods to hydrogenate polymers containing aromatic or ethylenic unsaturation based upon operation of a suitable catalyst may be employed. Such catalyst, or catalyst precursor, may comprise a Group VIII metal such as nickel or cobalt which is combined with a suitable reducing agent such as an aluminum alkyl or hydride of a metal selected from Groups I-A, II-A, and III-B of the Periodic Table. Hydrogenation processes are disclosed, for example, in U.S. Pat. Nos. 3,595,942; 3,634,549; 3,670,054; and 3,700,633; the relevant portions of which are incorporated herein by reference.

In an aspect, an SEB suitable for use in the present disclosure is a hydrogenated styrene/butadiene diblock copolymer. In an aspect, the molecular weight of the SEB (S block+B block) ranges from about from about 125 kg/mol to about 300 kg/mol, alternatively of from 160 kg/mole to about 270 kg/mol, alternatively from about 180 kg/mol to about 250 kg/mol, or alternatively from about 180 kg/mole to about 200 kg/mole. In an aspect, an SEB suitable for use in the present disclosure is a diblock copolymer (i.e., SEB) having less than about 5 wt. % of a triblock copolymer present (e.g., SEBS) based on the total weight of the styrenic block copolymer composition, alternatively less than about 2 wt. %, or alternatively less than about 1 wt. %. In an aspect, an SEB suitable for use in the present disclosure excludes a triblock copolymer.

In an aspect, an SEB of the type disclosed herein is present in the gel composition in an amount of from about 4 weight percent (wt. %) to about 20 wt. % based on the total weight of the gel composition, alternatively from about 10 wt. % to about 20 wt. %, alternatively in an amount of from about 5 wt. % to about 8 wt. % based on the total weight of the gel composition, alternatively in an amount of about 5 wt. %, or about 6 wt. %, or about 7 wt. % or about 8 wt. % based on the total weight of the gel composition.

In an aspect, the oil comprises a paraffinic oil. In some aspects, the paraffinic oil includes an oil-enriched in paraffin. Alternatively, a paraffinic oil is characterized by the presence of hydrocarbons having from 12 carbon atoms to 50 carbon atoms. Alternatively, the paraffinic oil includes a paraffin having an average number of carbon atoms that is less than or equal to about 20 (e.g., 16). In certain aspects, the paraffinic oil includes a paraffin having an average number of carbon atoms of from 16 to 30. In some aspects, a paraffinic oil suitable for use in the present disclosure can be a mixture of oils.

In an aspect, the oil comprises a mineral oil. Mineral oils are highly refined, colorless, and odorless petroleum oils. Mineral oil (also known as liquid petrolatum) is a by-product in the distillation of petroleum to produce gasoline. Mineral oil is a chemically inert oil composed mainly of linear, branched, and cyclic alkanes (paraffins) of various molecular weights. Nonlimiting examples of commercially available mineral oils include YUBASE 6 and PRIMOL 352.

In an aspect, the oil comprises a GTL-based process oil. GTL-based process oil is also referred to as Fischer-Tropsch derived oil. The term "Fischer-Tropsch derived" refers to a base oil, that is or is derived from, a synthesis product of a Fischer-Tropsch process. GTL-based process oils have a uniform chemical structure because they are manufactured from hydrocarbons derived from natural gas rather than crude oil.

In an aspect, the oil comprises synthetic oil. Herein synthetic oil refers to those oils that include non-naturally occurring components derived through chemical processes.

In an aspect, the composition comprises mineral oil, or a low toxicity synthetic oil such as ESCAID® 110 (Exxon Mobil Corp.), or paraffinic fluids such as Linpar® 1416 (Sasol Corp.) and SARALINE®185V (Shell Trading Int. Ltd.); or an internal olefin such as AlphaPlus® C1618 (Chevron Phillips Chemical Co.). Alternatively, the composition comprises a low toxicity synthetic oil, alternatively paraffinic oil, or alternatively internal olefin fluids such as $C_{16}$-$C_{18}$ internal olefin hydrocarbons. Suitable mineral oils may be naphthenic- or paraffinic-based. In some aspects, the oil comprises diesel, biodiesel and carboxylic acid esters such as 2-ethylhexyl oleate. Other nonlimiting examples of oils suitable for use in the present disclosure include Drakeol 34 (Calumet/Penreco.), In an aspect, the oil is a GTL-based process oil such as RISELLA X420 which is a hydrocarbon fluid based on Shell's Gas-to-Liquid technology that is highly saturated with a high degree of isoparaffinic structures.

In an aspect, an oil of the type disclosed herein (e.g., paraffinic, mineral, GTL, etc.) is present in the gel composition in an amount of from about 80 wt. % to about 96 wt. % based on the total weight of the gel composition.

In an aspect, the gel composition can comprise various other components to meet one or more user and/or process goals. Optionally, additives may be included to modify one or more properties of the gel compositions.

In an embodiment, the gel compositions optionally comprise an antioxidant. For example, antioxidants and other stabilizing ingredients can be added to protect the gel composition from degradation induced by heat, light and processing or during storage. Several types of antioxidants can be used, either primary antioxidants like hindered phenols or secondary antioxidants like phosphite derivatives or blends thereof. Examples of antioxidants suitable for use in the present disclosure are sterically hindered phenol type antioxidants such as IRGANOX 1010, liquid phenolic antioxidants such as IRGANOX L135 all of which are commercially available from Ciba-Geigy. Other examples include the antioxidants IRGANOX 1076 and IRGANOX 1035, both commercially available from Ciba-Geigy and MARK 2112, MARK 1500, and MARK 5014, commercially available from Witco.

In some aspects, the gel composition optionally comprises a metal deactivator. Examples of suitable metal deactivators include REOMEL 39 LF and other commercially available products known in this field.

In some aspects, the gel composition optionally comprises a rheology modifier. Rheology modifiers may be included in the gel composition to meet one or more user or process goals, such as the adjusting the flow properties of the gel composition. In aspect, the rheology modifier is an inorganic material such as fumed silica or specialty clays such as attapulgites, or castor oil based thixotropes and the like. A nonlimiting example of a rheology modifier suitable for use in the gel composition is CAB-O-SIL® TS720 commercially available from Cabot Corp.

In an aspect, the gel composition comprises a hydrocarbon resins. Any hydrocarbon resin compatible with the S block of the polymer may be utilized. Nonlimiting examples of suitable resins include SYLVARES™ SA-140 commercially available from Arizona Chemical and KRISTALEX™ 5140 commercially available from Eastman.

In an aspect, the gel composition may comprise additives of the type disclosed herein in amounts ranging from about 0.001 wt. % to about 4 wt. % based on the total weight of the gel composition. For example, an antioxidant may be present in the gel composition in an amount of about 0.5 wt. % based on the total weight of the gel composition. For example, the hydrocarbon resin may be present in an amount of 0.001 wt. % to about 5 wt. %, alternatively in an amount of 0.001 wt. % to 4 wt. %.

In an aspect, a gel composition comprising a SEB, an oil, and optionally additives, all of the type disclosed herein, may be prepared using any suitable methodology. For example, a method of preparing the gel composition may comprise heating the oil (e.g., mineral oil) to a temperature of about 120° C. and then dissolving the SEB into the preheated oil with high shear mixing for a suitable time period to produce a homogeneous mixture. The mixture may be aged for some time period of equal to or greater than about 8 hours, alternatively equal to or greater than about 12 hours. Alternatively, the components (i.e., SEB, oil, optional additives) can mixed together at low shear at 25° C. The mixture can then be heated to 120° C.-150° C. until the SEB is completely dissolved in the oil. The gel composition can then be cooled to 25° C. under vacuum to remove any entrapped air bubbles.

In an aspect, a gel composition of the type disclosed herein may be characterized by a low shear rate viscosity at 25° C. and a shear rate of 6 s$^{-1}$ of from about 10,000 centipoise (cps) to about 750,000 cps; alternatively from about 45,000 cps to about 500,000 cps; alternatively from about 100,000 cps to about 400,000 cps; alternatively from about 200,000 cps to about 300,000 cps; or alternatively from about 16,100 cps to about 29,990 cps.

In an aspect, a gel composition of the type disclosed herein may be characterized by a middle shear rate viscosity at 25° C. and a shear rate of 50 s$^{-1}$ of from about 1,000 cps to about 100,000 cps; alternatively from about 20,000 cps to about 80,000 cps; alternatively from about 35,000 cps to about 75,000 cps; alternatively from about 3,000 cps to about 9,000 cps, alternatively from about 3,200 cps to about 4,800 cps, or alternatively from about 4,400 cps to about 8,000 cps.

In an aspect, a gel composition of the type disclosed herein may be characterized by a high shear rate viscosity at 25° C. and a shear rate of 200 s$^{-1}$ of from about 1,000 cps to about 6,000 cps, or alternatively from about 2,000 cps to about 4,000 cps.

In an aspect, a gel composition of the type disclosed herein may be characterized by a thixotropic ratio (ratio of viscosity at high shear rate/viscosity at low shear rate) at 25° C. of from about 5 to about 10, or alternatively from about 6.5 to about 8.5.

In an aspect, a gel composition of the type disclosed herein may be characterized by a drop point of from about 100° C. to about 250° C., or alternatively from about 150° C. to about 250° C. as determined according to ASTM D566.

In an aspect, a gel composition of the type disclosed herein may be characterized by a cone penetration at 25° C. of from about 150 decimillimeter (dmm) to about 685 dmm, alternatively 160 dmm to 500 dmm, alternatively of from about 170 dmm to 500 dmm, alternatively of from 200 dmm to 500 dmm, alternatively of from 300 dmm to 500 dmm as determined according to ASTM D937.

In an aspect, a gel composition of the type disclosed herein may be characterized by a cone penetration at −40° C. of equal to or less than about 200 dmm.

In an aspect, a gel composition of the type disclosed herein may be characterized by an oil separation at 100° C. of from about 0.001% to about 80%, alternatively from about 0.001% to less than about 2%, or alternatively about 0 as determined according to ASTM D6184.

In an aspect, the gel composition may be contacted with other components as needed to form a material that meets some user and/or process goal. For example, the gel composition may be formed into a mixture comprising the gel composition and one or materials selected from the group consisting of fumed silica, organophilic clay, and a second type of styrenic block copolymer. These components may be present in any amount effective to perform their intended function and consistent with the aforementioned component amounts.

In an aspect, the gel composition is formed into a mixture by contact with fumed silica. Fumed silica or silicon dioxide is primarily used as a thixotropic thickening agent to modify the flow characteristics of a composition. Fumed silica is conventionally produced by the hydrolysis of silicon tetrachloride vapor in the presence of a combustion flame of hydrogen and oxygen gases. The same droplets of silicon dioxide ($SiO_2$) (e.g., about 7-14 millimicrons in diameter) collide and fuse together to form branched, chain-like aggregates. As the fused aggregates cool below the fusion temperature, the silicon dioxide aggregates fuse together and become physically entangled to form agglomerates. During formation of the fumed silica particles, chemical groups become attached to some of the silicon atoms on the surface of the particles. These chemical groups include hydrophilic hydroxyl groups; hydrophilic hydrogen bonded hydroxyl; and nonpolar siloxane groups.

In an aspect, the gel composition is formed into a mixture comprising an organophilic clay i.e., chemically modified clay, such as bentonite, hectorite or attapulgite. An example of commercially available organophilic clay is the VG-69 clay sold by M-I L.L.C. of Houston, Tex.

In an aspect, the gel composition is formed into a mixture comprising an additional styrenic polymer (i.e., other than an SEB of the type disclosed herein). For example, the mixture may comprise a hydrogenated styrene-isoprene (or styrene-ethylene/propylene) block copolymer or hydrogenated, controlled distribution S-EB/S or S-EB/S-S or (S-EB/S)$_n$X where X is the remnant of a coupling agent. In an aspect, the gel composition may include the styrenic diblock copolymer is a hydrogenated styrenic block copolymer and designated SEB while a hydrogenated styrenic triblock copolymer is designated SEBS.

The gel compositions disclosed herein may be utilized in a variety of applications. For example, the gel compositions disclosed herein may be components of an oilfield servicing composition such as insulating packer fluids, transportation slurries, drilling muds, and drill-in fluids. Alternatively, the gel compositions may be components of a protective material for a transmission component such as thixotropic greases or flooding gels for fiber optic cables or filling gels for copper cable. Alternatively, the gel compositions may function as an additive for personal care products such as cosmetic oils and greases. Additional nonlimiting examples of materials that may include a gel composition of the type disclosed herein are heat transfer fluids, gels for corrosion resistance, cleaning and degreasing agents, process oils, agricultural gels for seeds, crop protection and grain dust suppression, textile coatings, concrete molds, shoe polish, paint, paint remover, furniture oils, wood preservatives, heating or cooking fuel, potting gels (LED, Seismic, etc.), base stock oils, shock absorber fluids, compressor oils, lubricants, and metal working fluids.

EXAMPLES

The subject matter of the present disclosure having been generally described, the following examples are given as particular aspects of the disclosure and to demonstrate the practice and advantages thereof. It is understood that the examples are given by way of illustration and are not intended to limit the specification or the claims to follow in any manner.

Example 1

Polymer Synthesis—Polymers A, B, and E

The general procedure for the preparation of Polymers A, B, and E is described for Polymer A. 4.7 kg of solvent, and 30 mL of catalyst (about 2.5 wt. %, 0.27 mole/liter) were added, followed by a small charge of butadiene, followed by inclusion of a suitable microstructure modifier to the reactor to achieve a 38 wt. % to 40 wt. % vinyl content. The remainder of the butadiene, totaling 0.7 kg, was then charged to the reactor. Polymerization was allowed to proceed at about 60° C. until the reaction of butadiene was complete, at which time, 0.3 kg of styrene was added. When the polymerization of styrene was complete, 2-ethylhexanol was added at a ratio of one mole per mole of lithium (slight excess of 1.15), in order to terminate the polymerization.

The resulting butadiene-styrene block copolymer solution was hydrogenated using a standard Ni/Al technique. The polymer was recovered by hot water coagulation under conditions typical for hydrogenated polymers.

Polymer Synthesis—Polymers C, D, F, G, and H

The general procedure for the preparation of Polymers C, D, F, G, and H is described for Polymer C. 778 kg of solvent, 266.6 kg of butadiene, and followed by inclusion of a suitable microstructure modifier to the reactor to achieve a 38 wt. % to 40 wt. % vinyl content 640 grams of catalyst solution (12 wt. %) was added to initiate the polymerization. Polymerization was initiated at a maximum temperature of about 53° C. Once the butadiene was completely polymerized, 119.7 kg of styrene was added. When the polymerization of styrene was complete, methanol was added in order to terminate the polymerization.

The resulting butadiene-styrene block copolymer solution was hydrogenated using a standard Co/Al technique. The polymer was recovered by hot water coagulation under conditions typical for hydrogenated polymers.

Example 2

Gel compositions of the type disclosed herein were prepared utilizing the polymers (i.e., SEB) prepared in Example 1. Specifically, the following examples describe gel compositions that were formed utilizing the indicated polymers and the indicated oils.

Polymer A and a GTL Oil

Polymer A had a $M_s$ (styrene equivalent molecular weight) of 188 kg/mol, a polystyrene content of 30.9 wt. %, and a vinyl content of about 38%. A gel composition, designated GC1, was prepared by preheating RISELLA 420 oil (Shell Company) to 120° C., and then dissolving 8 wt. % Polymer A into the preheated oil using a SILVERSON high shear mixer at around 2500 rpm for 75 minutes. The resultant gel showed a shear-thinning, translucent and smooth appearance.

The performance of GC1 was tested based on the technical requirements for filling gel application. GC1 was conditioned at room temperature overnight before testing. The viscosity was tested at 25° C. using a Brookfield HBDV-II+ Pro Viscometer with Spindle CPE52. The middle shear rate (50 l/s) viscosity of GC1 was 7969 cps. The oil separation testing was done at both 80° C. and 100° C. for 24 hrs. GC1 passed both tests with zero gel dropped. The drop point of GC1 was 214° C. as tested in accordance with ASTM D566. The cone penetration at room temperature of GC1 was 429 dmm as tested in accordance with ASTM D937.

A second gel composition utilizing Polymer A at a concentration of 7 wt. % was also prepared, designated GC2, by preheating RISELLA 420 oil to 120° C. and then dissolving 7 wt. % Polymer A into the preheated oil using a SILVERSON high shear mixer at 2500 rpm for 60 minutes. The resultant gel showed a shear-thinning, translucent and smooth appearance. The middle shear rate (50 l/s) viscosity of GC2 was 5323 cps. The oil separation testing was done at both 80° C. and 100° C. for 24 hrs. GC2 passed both tests with zero gel dropped. The drop point of GC2 was 209° C. as tested in accordance with ASTM D566. The cone penetration of GC2 at room temperature was 444 dmm as tested in accordance with ASTM D937.

Polymer A and Yubase Oil

A gel comprising Polymer A and YUBASE 6 base oil (SK Lubricant) was prepared and designated GC3. 8 wt. % Polymer A was dissolved into the preheated oil using a SILVERSON high shear mixer at 2500 for 90 minutes. The resultant gel showed a shear-thinning, translucent and smooth appearance.

The performance of GC3 was tested based on the technical requirements for filling gel application. GC3 was conditioned at room temperature overnight before testing. The viscosity was tested at 25° C. by Brookfield HBDV-II+ Pro Viscometer with Spindle CPE52. The middle shear rate (50 l/s) viscosity of GC3 was 13684 cps, which was higher than the gel viscosity based on RISELLA 420 oil (i.e., GC1 or GC2). The oil separation testing was done at both 80° C. and 100° C. for 24 hrs. GC3 passed both tests with zero gel dropped Polymer A and Mineral Oil A gel comprising Polymer A and a mineral oil was prepared and designated GC4. Specifically, GC4 was prepared by preheating the mineral oil (Super 150N base oil commercially available from S-Oil Company) to 120° C., and then dissolving 5 wt. % Polymer A into the preheated oil using a SILVERSON high shear mixer at around 2000 rpm for 60 minutes. The resultant gel showed a shear-thinning, clear, and smooth appearance.

The performance of GC4 was tested based on the technical requirements for flooding gel application. GC4 was conditioned at room temperature overnight before testing. The viscosity was tested at 25° C. by Brookfield HBDV-II+ Pro Viscometer with Spindle CPE52. The shear rate at 20 l/s viscosity of GC4 was 5001 cps, and the viscosity at 50 l/s was 3048 cps. The drop point of GC4 was 187° C. as tested in accordance with ASTM D566. The cone penetration at room temperature of GC4 was 540 dmm as tested in accordance with ASTM D937, and the cone penetration at −40° C. was 166 dmm.

Example 3

Polymer B and GTL Oil

Polymer B had a $M_s$ of 163 kg/mole, a polystyrene content of 36.6%, and a vinyl content of about 44%. A gel composition was prepared by preheating RISELLA 420 oil to 120° C. and then dissolving 8 wt. % polymer B into the preheated oil using a SILVERSON high shear mixer at around 2500 rpm for 90 minutes. The resultant gel composition, designated GC5, showed a shear-thinning, translucent and smooth appearance.

The performance of GC5 was tested based on the technical requirements for filling gel application. GC5 was conditioned at room temperature overnight before testing. The viscosity was tested at 25° C. by Brookfield HBDV-II+ Pro Viscometer with Spindle CPE52. The middle shear rate (50 l/s) viscosity of GC5 was 3874 cps. The oil separation testing was done at both 80° C. and 100° C. for 24 hrs. There was 20 wt. % gel was found at the beaker bottom after the testing GC5 at 80° C. for 24 hrs., and 23 wt. % gel was found at the beaker bottom after testing at 100° C. for 24 hrs. It indicates that GC5 failed in the oil separation testing. The drop point of GC5 was 219° C. tested in accordance with ASTM D566. The cone penetration at room temperature of GC5 was 477 dmm as tested in accordance with ASTM D937.

This experiment was repeated using 7 wt. % Polymer B in the gel composition and the composition designated GC6. GC6 had a shear-thinning, translucent and smooth appearance. GC6 had a middle shear rate (50 l/s) viscosity of 2910 cps. The oil separation testing was done at both 80° C. and 100° C. for 24 hrs. There was more than 50 wt. % gel found at the beaker bottom used in preparation of GC6 after the testing at both 80° C. and 100° C. It indicates that GC6 failed the oil separation testing.

Polymer B and YUBASE Oil

A gel composition was also prepared comprising Polymer B and YUBASE 6 base oil and designated GC7. 7 wt. % polymer B was dissolved into the preheated oil by SILVERSON high shear mixer at around 2500 rpm for 60 minutes. GC7 had a shear-thinning, translucent and smooth appearance.

The performance of GC7 was tested based on the technical requirements for filling gel application. GC7 was conditioned at room temperature overnight before testing. The viscosity was tested at 25° C. by Brookfield HBDV-II+ Pro Viscometer with Spindle CPE52. The middle shear rate (50 l/s) viscosity of GC7 was 5001 cps. The oil separation testing was done at both 80° C. and 100° C. for 24 hrs. There was more than 40 wt. % gel found at the beaker bottom of GC7 after the testing at both 80° C. and 100° C. It indicates that GC7 failed the oil separation testing.

Polymer C and GTL Oil

Polymer C had a $M_s$ of 193 kg/mole, a polystyrene content of 34.6%, and a vinyl content of about 40%. A gel composition was prepared by preheating RISELLA 420 oil to 120° C., and then dissolving 8 wt. % Polymer C into the preheated oil by SILVERSON high shear mixer at 2500 rpm for 60 minutes. The sample was designated GC8. GC8 had a shear-thinning, clear and smooth appearance.

The performance of GC8 was tested based on the technical requirements for filling gel application. The gel was conditioned at room temperature overnight before testing. The viscosity was tested at 25° C. by Brookfield HBDV-II+ Pro Viscometer with Spindle CPE52. The middle shear rate (50 l/s) viscosity of GC8 was 7281 cps. The oil separation testing was done at both 80° C. and 100° C. for 24 hrs. GC8 passed both the tests with zero gel dropped. The drop point of GC8 was 219° C. as tested in accordance with ASTM D566. The cone penetration at room temperature of GC8 was 436 dmm as tested in accordance with ASTM D937.

This experiment was repeated using 7 wt. % Polymer C in the gel composition and the sample designated GC9. The performance was tested based on the technical requirements for filling gel application. The middle shear rate (50 l/s) viscosity of GC9 was 5037 cps. There was 11 wt. % gel was found at the beaker bottom after testing GC9 at 80° C., and 13 wt. % gel was found at the beaker bottom after the testing at 100° C. It indicated GC9 failed the oil separation testing. The drop point of GC9 was 217° C. as tested in accordance with ASTM D566.

Polymer C and YUBASE Oil

A gel composition was also prepared comprising Polymer C and YUBASE 6 Group III base oil and designated GC10. 8 wt. % polymer C was dissolved into the preheated oil by SILVERSON high shear mixer at 2500 rpm for 60 minutes. GC10 had a shear-thinning, clear and smooth appearance.

The performance of GC10 was tested based on the technical requirements for filling gel application. The gel was conditioned at room temperature overnight before testing. The viscosity was tested at 25° C. by Brookfield HBDV-II+ Pro Viscometer with Spindle CPE52. The middle shear rate (50 l/s) viscosity of GC10 was 12192 cps. The oil separation testing was done at both 80° C. and 100° C. for 24 hrs. GC10 passed both tests with zero gel dropped. The drop point of GC10 was 218° C. as tested in accordance with ASTM D566.

This experiment was repeated using 7 wt. % Polymer C in the gel composition and the sample designated GC11. GC11 had a shear-thinning, clear and smooth appearance. The performance was tested based on the technical requirements for filling gel application. The middle shear rate (50 l/s) viscosity of GC11 was 8551 cps. The oil separation testing was done at both 80° C. and 100° C. for 24 hrs. GC11 passed both tests with zero gel dropped.

Polymer C and Mineral Oil

A gel comprising Polymer C and a mineral oil was prepared and designated GC12. Specifically, GC12 was prepared by preheating the Super 150N base oil to 120° C. and then dissolving 5 wt. % Polymer C into the preheated oil by SILVERSON high shear mixer at around 2500 rpm for 60 minutes. GC12 had a shear-thinning, clear and smooth appearance. The performance of GC12 was tested based on the technical requirements for flooding gel application. GC12 was conditioned at room temperature overnight before testing. The viscosity was tested at 25° C. by Brookfield HBDV-II+ Pro Viscometer with Spindle CPE52. The viscosity of GC12 at 20 l/s shear rate was 5080 cps, and the viscosity at 50 l/s viscosity was 3126 cps. The drop point of GC12 was 192° C. as tested in accordance with ASTM D566. The cone penetration of GC12 at room temperature was 557 dmm as tested in accordance with ASTM D937, and the cone penetration at −40° C. was 177 dmm.

Polymer D and GTL Oil

Polymer D had a $M_s$ of 250 kg/mole, a polystyrene content of 37.2%, and a vinyl content of about 49%. A gel composition, designated GC13, was prepared by preheating RISELLA 420 oil (Shell Company) to 120° C., and then dissolving 8 wt. % Polymer D into the preheated oil by SILVERSON high shear mixer at 2500 rpm for 60 minutes. GC13 had a shear-thinning, smooth, clear and bluish appearance.

The performance of GC13 was tested based on the technical requirements for filling gel application. GC13 was conditioned at room temperature overnight before testing. The viscosity was tested at 25° C. by Brookfield HBDV-II+ Pro Viscometer with Spindle CPE52. The middle shear rate (50 l/s) viscosity of GC13 was 6593 cps. The oil separation testing was done at both 80° C. and 100° C. for 24 hrs. GC13 passed both tests with zero gel dropped.

This experiment was repeated using 7 wt. % Polymer D in the gel composition and the sample designated GC14. The middle shear rate (50 l/s) viscosity of GC14 was 4710 cps. The oil separation testing was done at both 80° C. and 100° C. for 24 hrs. There was 32 wt. % gel was found at the beaker bottom after the testing GC14 at 80° C., and 34 wt. % gel was found at the beaker bottom after the testing at 100° C. It indicated GC14 failed in the oil separation testing.

Polymer D and YUBASE OIL

A gel composition was also prepared comprising Polymer D and YUBASE 6 base oil, designated GC15. 7 wt. % Polymer D was dissolved into the preheated oil by SILVERSON high shear mixer at around 2500 rpm for 60 minutes. GC15 had a shear-thinning, smooth, clear and bluish appearance. The performance of GC15 was tested based on the technical requirements for filling gel application. The gel was conditioned at room temperature overnight before testing. The viscosity was tested at 25° C. by Brookfield HBDV-II+ Pro Viscometer with Spindle CPE52. The middle shear rate (50 l/s) viscosity of GC15 was 7525 cps. The oil separation testing was done at both 80° C. and 100° C. for 24 hrs. There was 24 wt. % gel was found at the beaker bottom after the testing at 80° C. of GC15, and 25 wt. % gel was found at the beaker bottom after the testing at 100° C. It indicated GC15 failed in the oil separation testing.

Polymer D and Mineral Oil

A gel comprising Polymer D and a mineral oil was prepared and designated GC16. Specifically, GC16 was prepared by preheating the Super 150N base oil to 120° C., and then dissolving 5 wt. % Polymer D into the preheated oil by SILVERSON high shear mixer at around 2500 rpm for 60 minutes. GC16 had a shear-thinning, clear and smooth appearance. The performance of GC16 was tested based on the technical requirements for flooding gel application. The gel was conditioned at room temperature overnight before testing. The viscosity was tested at 25° C. by Brookfield HBDV-II+ Pro Viscometer with Spindle CPE52. The viscosity at 20 l/s shear rate of GC16 was 3572 cps, and the viscosity at 50 l/s viscosity was 2318 cps. The drop point of GC16 was 161° C. tested by ASTM D566. The cone penetration at room temperature of GC16 was 686 Dmm was tested in accordance with ASTM D937 and the cone penetration at −40° C. was 175 Dmm.

Polymer E and GTL Oil

Polymer E had a Ms of 209 kg/mole, a polystyrene content of 32.4%, and a vinyl content of about 50%. A gel composition, designated GC17, was prepared by preheating RISELLA 420 oil to 120° C. and then dissolving 8 wt. % Polymer E into the preheated oil by SILVERSON high shear mixer at around 2500 rpm for 60 minutes. GC17 had a shear-thinning, translucent and smooth appearance. The performance of GC17 was tested based on the technical requirements for filling gel application. The gel was conditioned at room temperature overnight before testing. The viscosity was tested at 25° C. by Brookfield HBDV-II+ Pro Viscometer with Spindle CPE52. The middle shear rate (50 l/s) viscosity of GC17 was 6414 cps. The oil separation testing was done at both 80° C. and 100° C. for 24 hrs. GC17 passed both tests with zero gel dropped.

Polymers F, G, and H with GTL Oil

Polymer F, G and H had a Ms ranging from 188-194 kg/mole, a polystyrene content of 28.7%, a vinyl content of from about 30 to about 32%. Gel compositions were prepared by preheating RISELLA 420 oil to 120° C. and then dissolving 8 wt. % polymers into the preheated oil by SILVERSON high shear mixer at 2500 rpm for 60 minutes. The resultant gel compositions showed a clear appearance, but obvious elastic behavior was found. The elastic behavior could also be observed when polymer usage was decreased to 7 wt. %.

TABLE 1

| Polymer | Ms kg/mole | PSC (%) | Vinyl content (% Bd RU) |
|---|---|---|---|
| A | 188 | 30.9 | 38 |
| B | 163 | 36.6 | 44 |
| C | 193 | 34.6 | 40 |
| D | 250 | 37.2 | 49 |
| E | 209 | 32.4 | 50 |
| F | 189 | 28.7 | 30 |
| G | 188 | 28.7 | 32 |
| H | 194 | 28.7 | 32 |

TABLE 2

| Gel | Polymer | Oil | Viscosity at 25° C., cps | | | | Oil Separation, 24 hrs., % | | Drop point, °C. | Cone penetration, dmm | |
|---|---|---|---|---|---|---|---|---|---|---|---|
| | | | 6 s-1 | 50 s-1 | 200 s-1 | 6 s-/200 s-1 | 80° C. | 100° C. | | room temperature | −40° C. |
| GC1 | 8% A | Risella420 | 26811 | 7969 | 4218 | 6.4 | 0 | 0 | 214 | 429 | |
| GC2 | 7% A | Risella420 | 18521 | 5323 | 2903 | 6.4 | 0 | 0 | 209 | 444 | |
| GC3 | 8% A | Yubase6 | 33603 | 13684 | 6708 | 5.0 | 0 | 0 | | | |
| GC4 | 5% A | Super150N | 10319 | 3048 | 1842 | 5.6 | 74 | | 187 | 540 | 166 |
| GC5 | 8% B | Risella420 | 16404 | 3874 | 1786 | 9.2 | 20 | 23 | 219 | 477 | |
| GC6 | 7% B | Risella420 | 10054 | 2910 | 1511 | 6.7 | >50 | >50 | | | |
| GC7 | 7% B | Yubase6 | 16404 | 5001 | 2889 | 5.7 | 40 | 41 | | | |
| GC8 | 8% C | Risella420 | 26194 | 7281 | 4038 | 6.5 | 0 | 0 | 219 | 436 | |
| GC9 | 7% C | Risella420 | 17199 | 5037 | 2741 | 6.3 | 11 | 13 | 217 | | |
| GC10 | 8% C | Yubase6 | 35719 | 12192 | 5802 | 6.2 | 0 | 0 | 218 | | |
| GC11 | 7% C | Yubase6 | 25224 | 8551 | 4628 | 5.5 | 0 | 0 | | | |
| GC12 | 5% C | Super150N | 9790 | 3126 | 1857 | 5.3 | 75 | | 192 | 557 | 177 |
| GC13 | 8% D | Risella420 | 22225 | 6593 | 3500 | 6.4 | 0 | 0 | | | |
| GC14 | 7% D | Risella420 | 15434 | 4710 | 2630 | 5.9 | 32 | 34 | | | |
| GC15 | 7% D | Yubase6 | 23019 | 7525 | 4175 | 5.5 | 24 | 25 | | | |
| GC16 | 5% D | Super150N | 6879 | 2318 | 1397 | 4.9 | 79 | | 161 | 686 | 175 |
| GC17 | 8% E | Risella420 | 22490 | 6414 | 3376 | 6.7 | 0 | 0 | | | |

TABLE 4

| | Sample no. | | | | | | | |
|---|---|---|---|---|---|---|---|---|
| | 1 | 3 | 14 | 15 | 4 | 5 | 10 | 11 |
| Y1 | 17.0 | — | — | — | — | — | — | — |
| Y2 | — | 17.0 | 13.0 | 17.0 | — | — | — | — |
| Polymer C | — | — | — | — | 17.0 | — | — | — |
| Polymer D | — | — | — | — | — | 17.0 | 15.0 | 13.0 |
| Sylvares SA 140 | — | — | — | 2.0 | — | — | — | — |
| Primol 352 | 82.9 | 82.9 | 86.9 | 80.9 | 82.9 | 82.9 | 84.9 | 86.9 |
| Irganox 1010 | 0.1 | 0.1 | 0.1 | 0.1 | 0.1 | 0.1 | 0.1 | 0.1 |
| Viscosity at 25° C. at shear rate | | | | | | | | |
| 10 s$^{-1}$ Pa.s | 116 | 410 | 192 | 478 | 315 | 487 | 283 | 196 |
| 20 s$^{-1}$ | 105 | 209 | 130 | 270 | 176 | 249 | 177 | 130 |
| 100 s$^{-1}$ | 24 | 28 | 22 | 16 | 22 | 18 | 29 | 27 |
| Cone penetration, dmm | 281 | 254 | 297 | 248 | 246 | 237 | 266 | 276 |

Viscosity was measured at 25° C., on a HAAKE RHEOSTRESS 150 rheometer in plate/cone geometry, one day after preparation of the oil gels. The cone has a diameter of a 20 mm and angle of 1°. The rheometer is equipped with a Peltier TC81 hot plate. A shear ramp was applied. Cone penetration was measured according to ASTM D937, but at 22° C. instead of 25° C. This property reflects the consistency (resistance to movement under stress) of an oil gel.

All oil gels were greases with a shear thinning behavior. This shear thinning effect is more pronounced with Polymer C and Polymer D in comparison to Y1 and Y2. Polymer D leads to a significant increase in viscosity of the oil, in combination with better cone penetration properties than Y1 and Y2. Addition of hydrocarbon resin, compatible with the styrene block of the molecules, leads to improved cone penetration values and enhances the shear thinning behavior of the oil gels.

The terms "a," "an," and "the" are intended, unless specifically indicated otherwise, to include plural alternatives, e.g., at least one. Herein, while compositions and processes are described in terms of "comprising" various components or steps, the compositions and methods can also "consist essentially of" or "consist of" the various compo-

Example 3

Gel compositions were prepared comprising the indicated polymer, PRIMOL 352, paraffinic white oil, IRGANOX 1010, primary anti-oxidant and KRISTALEX 5140, hydrocarbon endblock resin, commercially available from Eastman with a glass transition temperature of (Tg)=85° C., and an ring and ball softening point=139° C. Additional polymer properties are presented in Table 3 while gel composition properties are presented in Table 4.

TABLE 3

| Polymer | Type | $M_s$, kg/mol | PSC, % |
|---|---|---|---|
| Y1 | S-EP | 127 | 35.1 |
| Y2 | S-EP | 184 | 27.6 |
| Polymer C | S-EB | 193 | 34.6 |
| Polymer D | S-EB | 250 | 37.2 | nents or steps. A particular feature of the disclosed subject matter can be disclosed as follows: Feature X can be A, B, or C. It is also contemplated that for each feature the statement can also be phrased as a listing of alternatives such that the statement "Feature X is A, alternatively B, or alternatively C" is also an embodiment of the present disclosure whether or not the statement is explicitly recited.

While various aspects of the present disclosures have been shown and described, modifications thereof can be made by one skilled in the art without departing from the spirit and teachings of the invention. The aspects of the present disclosures described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an aspect of the present disclosure of the present invention. Thus, the claims are a further description and are an addition to the aspect of the present disclosures of the present disclosure. The discussion of a reference in the present disclosure is not an admission that it is prior art to the present disclosure, especially any reference that may have a publication date after the priority date of this application. The present disclosures of all patents, patent applications, and publications cited herein are hereby incorporated by reference, to the extent that they provide exemplary, procedural or other details supplementary to those set forth herein.

The invention claimed is:

1. A composition comprising
   i) a hydrogenated styrenic block copolymer having a peak molecular weight of from 125 to 300 kg/mol, wherein said hydrogenated styrenic block copolymer is a diblock copolymer of formula S-EB;
      wherein S is a polymer block of a monoalkenyl arene, and EB is a hydrogenated polymer block of 1,3-butadiene;
   ii) an oil; and
   iii) optionally one or more additives;
   wherein the composition forms a gel having a thixotropic ratio at 25° C. of from 5 to 10.

2. The composition of claim 1, wherein the monoalkenyl arene comprises styrene, alpha-methystyrene, para-methylstyrene, vinyl toluene, vinylnaphthalene, diphenyl ethylene, para-butyl styrene, or mixtures thereof.

3. The composition of claim 1, wherein prior to hydrogenation, the vinyl content of the polymer block of 1,3-butadiene ranges from 35 wt. % to 49 wt. %.

4. The composition of claim 1, wherein prior to hydrogenation, the hydrogenated styrenic block copolymer has a poly(monoalkenyl arene) content of from 28 wt. % to 40 wt. %.

5. The composition of claim 1, wherein the hydrogenated styrenic block copolymer is present in an amount of from 4 wt. % to 20 wt. % based on the total weight of the composition.

6. The composition of claim 1, wherein the oil comprises a paraffinic oil, a mineral oil, a GTL-based process oil, a synthetic oil, a low toxicity oil, or combinations thereof.

7. The composition of claim 6, wherein the oil is present in an amount of from 80 wt. % to 96 wt. % based on the total weight of the composition.

8. The composition of claim 1, further comprising at least one of an antioxidant, a metal deactivator, a rheology modifier, a hydrocarbon resin, fumed silica, organophillic clay or combinations thereof.

9. The composition of claim 1, wherein the one or more additives is present in an amount ranging from 0.0001 wt. % to 4 wt. %, based on the total weight of the composition.

10. The composition of claim 1, having a low shear rate viscosity at 25° C. and a shear rate of 6 $s^{-1}$ of from 10,000 cps to 750,000 cps.

11. The composition of claim 1, having a middle shear rate viscosity at 25° C. and a shear rate of 50 $s^{-1}$ of from 1,000 cps to 100,000 cps.

12. The composition of claim 1, having a high shear rate viscosity at 25° C. and a shear rate of 200 $s^{-1}$ of from 1,000 cps to 6,000 cps.

13. The composition of claim 1, having a drop point of from 100° C. to 250° C.

14. The composition of claim 1, having a cone penetration at 25° C. of from 300 dmm to 685 dmm.

15. The composition of claim 1, having a cone penetration at −40° C. of equal to or less than 200 dmm.

16. The composition of claim 1, having an oil separation at 100° C. of from 0.001% to 80%.

17. The composition of claim 1, further comprising a hydrocarbon resin.

* * * * *